Aug. 7, 1923.
H. H. ARMSTRONG
1,463,782
PROCESS OF RECOVERING CONDENSIBLE VAPORS FROM GASES
Filed July 14, 1919
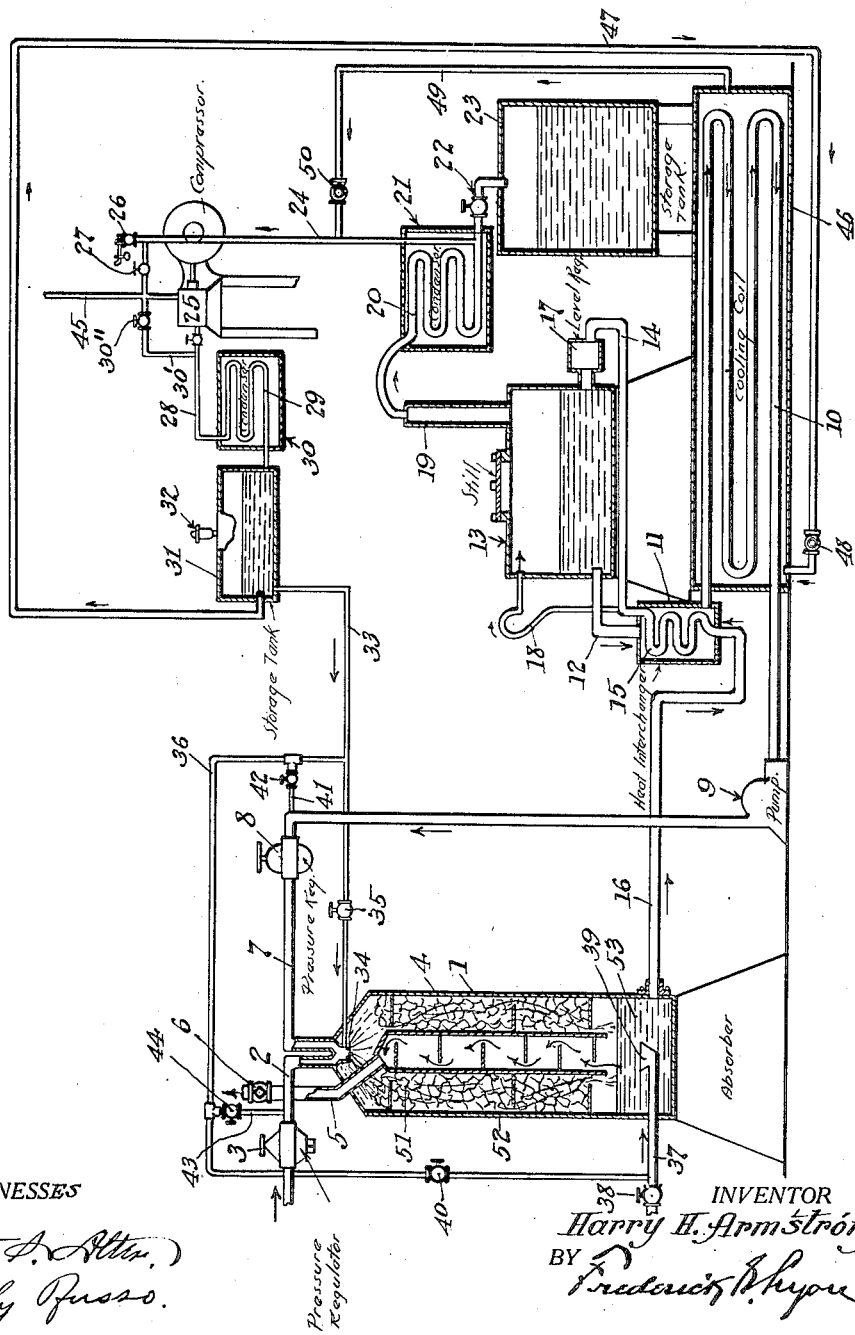

Patented Aug. 7, 1923.

1,463,782

UNITED STATES PATENT OFFICE.

HARRY H. ARMSTRONG, OF LOS ANGELES, CALIFORNIA, ASSIGNOR TO THE ARMSTRONG COMPANY, OF LOS ANGELES, CALIFORNIA, A CORPORATION OF CALIFORNIA.

PROCESS OF RECOVERING CONDENSABLE VAPORS FROM GASES.

Application filed July 14, 1919. Serial No. 310,756.

*To all whom it may concern:*

Be it known that I, HARRY H. ARMSTRONG, a citizen of the United States, residing at Los Angeles, in the county of Los Angeles and State of California, have invented a new and useful Process of Recovering Condensable Vapors from Gases, of which the following is a specification.

This invention relates to a process whereby condensable vapors are recovered from gases and the invention is especially serviceable in the extraction of condensable hydrocarbon vapors, (liquid gases, gasoline and naphthas) from casing-head and natural gases which are derivable respectively from oil bearing sands and sands carrying socalled natural gases.

There are at present in use certain processes for extracting hydrocarbon vapors from natural and casing-head gases, which processes follow in general the steps employed in extracting benzole, toluol, and other light oil vapors from gases made by the destructive distillation of coal. In such processes for extracting hydrocarbon vapors the gases are made to flow counter to a stream or wash of absorbent oil such as creosote, so as to cause the absorbent oil to absorb the light oil vapors such as benzole, toluol and the like. This oil thus saturated or charged with the lighter vapors is then treated in stills for the extraction of the lighter oil vapors. Then the absorbent oil is cooled and is utilized again for absorbing more of the lighter oil vapors which in turn are recovered from the absorbent oil by distillation. Thus the creosote or other absorbent oil is employed over and over. In the, socalled, absorption gasoline process the process just described is employed excepting that it is usually performed at relatively high pressures, for example, from twenty-five to three-hundred pounds per square inch.

"Low boiling point liquid gases" are terms at present applied in the art to those fluids which are in the form of gases at atmospheric pressures and the prevailing natural temperatures and which become liquids at relatively low artificial pressures; and the term is so employed herein.

I have discovered that an absorbent medium such as oil, if partially saturated with low boiling point liquid gases, will absorb medium boiling point liquids much more readily and faster than if the absorbent medium is not first partially saturated with such low boiling point liquid gases. Moreover I have discovered that, if low boiling point liquid gases are injected into the oil and the mixture is atomized so as to allow the mixture to expand, the mixture will not only be reduced in temperature but will be rendered more solvent or absorbent of the condensable vapors carried by gases that are being treated for extraction of the condensable vapors.

I have discovered more particularly that, if the absorbent oil be a petroleum derivative and has injected into it such low boiling point liquid gases as pentane, butane and propane and the mixture so produced is then atomized in the presence of natural or casing-head gas; or, if the natural or casing-head gas is used to help atomize the absorbent oil partially saturated with low boiling point liquid gases, the condensable vapors such as the gasolines and naphthas will be more readily taken up or absorbed by the oil than is possible by the operation of any processes at present in use. This is due, in a measure, to the presence of the low boiling-point liquid gases and also, in a measure, to the cooling or refrigeration of the mixture by the expansion thereof. Furthermore the presence of the liquid hydrocarbons causes a reduction in the viscosity and increase in Baumé gravity of the absorbent oil, thus resulting in the absorbent oil flowing much more freely and consequently covering a greater surface or area in a given period of time than would otherwise be the case. This lessening of viscosity is very desirable in absorption processes.

Instead of partly saturating the absorbent oil with low boiling point liquid gases, the liquid gases may be injected with the gas being treated for recovery of gasoline and naphtha just before the latter gas comes in contact with the absorbent oil. This results in a relatively large amount of refrigeration.

An object of the invention is to recover a higher percentage of condensable vapors from gases than is possible by the old processes.

Another object is to recover the lighter condensable vapors such as gasoline and naphtha in relatively great quantities from hydrocarbon vapors such as those contained in natural and casing-head gases.

Another object is to provide a process in which the absorbent medium employed may be increased in absorption power.

Other objects and advantages will appear in the subjoined detailed description.

The accompanying drawing illustrates an apparatus which may be employed in performing the various steps or operations of the invention, the view being an elevation mainly in vertical mid section of the apparatus.

It is understood that the new process is not limited to being performed by the apparatus shown in the drawing and hereinafter described but that any other suitable apparatus may be employed for carrying out the invention. In the apparatus shown in the drawing there is provided an absorber 1 of any suitable construction and discharging into the upper portion of the absorber is a pipe line 2 adapted to feed the gases to be treated for extraction of condensable vapors to the absorber. The pipe line 2 may be provided with a pressure regulator 3 and said pipe line extends to a suitable source of supply such, for example, as an oil or gas well furnishing gas. Discharging from a central passage 4 of the absorber is a pipe line 5 to discharge gas from which the condensable vapors have been absorbed. The pipe line 5 is provided with a back pressure valve 6.

Also discharging into the upper portion of the absorber 1 is a pipe line 7 adapted to carry an absorbent medium or carrier which may be an oil such, for example, as a hydrocarbon oil. It is understood that the term "absorbent medium" is the term employed by those skilled in this art to designate such refined and semi-refined oils as heavy kerosene, gas oils and mineral seal stocks as distinguished from crude petroleum which, though having a slight absorbent value, is not termed in this art an absorbent medium and could not be practically employed in this process to obtain the valuable results due to the operation of the process with the absorbent medium, so called. The pipe line 7 is provided with a pressure regulator 8 and, if necessary, a pump 9 may be provided in the pipe line 7 to pump the absorbent medium through said pipe line. If the absorbent medium is fed by gravity the pump 9 may be omitted. The pipe line 7 connects with the lower end of a cooling coil 10 and the upper end of the cooling coil connects with a heat interchanger 11 into which discharges a pipe line 12 connected with the vaporizing chamber 13 of a still. The still chamber 13 is connected by a pipe line 14 to the coil 15 of the interchanger 11, the lower end of said coil being connected by a pipe line 16 to the lower portion of the absorber 1 so as to convey the absorbent medium, saturated with condensable vapors, from the vaporizer to the still. In this instance the pipe 14 is provided with a level regulator 17 for governing the level of the absorbent medium in the still. The pipe 14 near its connection with the coil 15 is provided with a vent pipe 18 discharging into the upper portion of the still chamber 13 and adapted to carry off from the heat interchanger 11 such high gravity vapors as are released in the heat interchanger.

From the upper portion of the still chamber 13 discharges a pipe line 19 which connects with a coil 20 of a condenser 21 which with the chamber 13 forms the still. The lower end of the coil 20 connects with a discharge faucet 22 which is positioned to discharge into a storage tank 23 or otherwise, as desired. The coil 20 is connected by a pipe line 24 to a compressor 25, there being a safety valve 26 and a manually operated valve 27 in the pipe line 24. From the compressor 25 discharges a pipe line 28 which connects with the upper end of a coil 29 of a condenser or refrigerating device 30. The compressor 25 need not be employed if refrigeration is effected and therefore there is provided a by pass pipe 30' connecting the pipe 24 to the pipe 28 and having a valve 30''. The lower end of the coil 29 connects with a tank 31 for storage of liquid gases, said tank being provided with a safety valve 32. To the tank 31 connects a pipe line 33 which discharges into the upper portion of the absorber 1 adjacent the pipe lines 2, 7. In the instance shown in the drawings the pipe lines 2, 7 are joined at their discharge ends to form a nozzle 34 and the pipe line 33 connects with said nozzle. The pipe line 33 is provided with a valve 35.

The pipe line 33 is connected between the tank 31 and valve 35 to a pipe line 36 which connects to a gas supply pipe line 37 provided with a pressure regulator 38. The pipe line 37 is adapted to supply the gases to be treated for extraction of the condensable vapors to the lower end of the absorber, if such operation is desired, said pipe line 37 being provided with a nozzle 39 positioned in the lower portion of the absorber 1. The pipe line 36 is provided with a valve 40 and, between said valve and the pipe line 33 the pipe line 36 is provided with a branch 41 which connects to the pipe line 7 between the pressure regulator 8 and the cooling coil 10. The branch pipe 41 is provided with a valve 42. Also the pipe line 36 is provided with a branch 43 which connects with the pipe line 2 between the pressure regulator 3 and the absorber 1. The branch pipe 43 is provided with a valve 44. An initial supply of liquid gases may be furnished to the compressor 25 by a pipe line 45 connected with the pipe line 24.

The oil-cooling coil 10 may be cooled by any suitable means and is encased in a box 46 in which a cooling medium may flow around the coil. In performing the process the low boiling point liquid gases may be taken from the tank 31 and discharged into the box 46 and therefore there is shown in the drawing a pipe line 47 connecting the box 46 with the tank 31 and having a valve 48. Also the box 46 is connected by a pipe line 49 with the pipe line 24 and the pipe line 49 is provided with a valve 50.

The various steps or operations of this newly discovered process are performed in the above described apparatus in the following manner. It will be assumed, merely for purposes of making clear the process as applicable to the extraction of condensable vapors of any description from any gases containing them, that the particular gases to be dealt with by the apparatus are hydrocarbon gases of the character given off by oil bearing sands and sands carrying natural gases. The gases to be treated are discharged into the absorber 1, either through the pipe line 2 or through the pipe line 37 or through both pipe lines 2 and 37. An absorbent medium such as a hydrocarbon oil is placed in the still chamber 13 and flows through the pipe line 12 into the heat interchanger 11, thence into the coil 10 and is forced by the pump 9 through the pipe line 7 into the absorber.

Low boiling point liquid gases, such, for instance, as pentane, butane or propane together or any one or two of them, will be supplied to the compressor 25 and compressed and then condensed in the condenser 30 and will flow into the tank 31 and will be injected either into the absorbent oil by opening the valve 42, or into the gases being treated by opening the valve 44 or 40 or both valves 44, 40. If the low boiling point liquid gases be admitted to the absorber through the pipe line 33 and nozzle 34, they together with the gases being treated will expand in the expansion chamber 46 formed by the absorber 1. This expansion of the liquid gases takes place in the presence of and in close proximity to or, in fact, in intimate contact with the absorbent oil. The expansion of the liquid gases produces refrigeration of the liquid gases, absorbent oil and gases being treated for recovery of the vapors in them. This refrigeration or cooling of the oil, as I have discovered, aids the oil in absorbing the condensable vapors contained in the gases being treated. The absorption power of the oil is also made comparatively high by reason of the presence of the low boiling point liquid gases.

The absorbent oil passes downwardly through the coke 51 or other material in the expansion chamber 52 and spreads over the surface of the material 51 and absorbs the condensable vapors in the gases being treated, such as the gasolines and naphthas, and the low boiling point liquid gases supplied through the pipe line 33, and also whatever low boiling point liquid gases there may be in the gases being treated. The absorbent oil now containing the gasoline, naphtha and liquid gases gathers in the bottom of the absorber 1 and passes into the pipe 16, thence into the coil 15 where it absorbs heat from the hot oil flowing from the still 13 into the heat interchanger 11 through the pipe 12. As the temperature of the absorbent oil rises in the heat interchanger some of the condensable vapors and low boiling point liquid gases pass in the form of vapor into the vent pipe 18 and thence into the upper portion of the still chamber 13.

The absorbent oil containing the unvaporized gasoline, vapors and low boiling point liquid gases still remaining in liquid condition discharges through the pipe line 14 into the lower portion of the still chamber 13 where said oil is subjected to heat so as to cause the remaining condensable vapors and the low boiling point liquid gases to vaporize and separate from the oil. All of the vapors given off in the still chamber 13 pass through the pipe line 19 into the condenser coil 20 where the condensable vapors such as gasoline and naphtha are condensed. These condensed vapors which are now liquids are drawn off through the faucet 22 into the storage tank 23. According to one mode of operation the low boiling point liquid gases discharge from the coil 20 through the pipe line 24 into the compressor 25 and are suitably compressed in said compressor to the desired degree. From the compressor 25 the low boiling point liquid gases under the increased pressure discharge into the condenser or refrigeration coil 29 which liquefies said liquid gases. According to another mode of operation the liquid gases discharge from the pipe line 24 through the pipe line 30' to the pipe line 28 and thence to the refrigerating coil 29. From the coil 29 the liquefied low boiling point liquid gases pass into the storage tank 31, thus completing the cycle through which the low boiling point liquid gases pass in the operation of the apparatus.

If desired, some of the liquefied liquid gases may be discharged from the tank 31 through the pipe line 47 to the box 46, where expansion of said liquid gases takes place so as to produce cooling of the coil 10, or any other preferred mode of cooling the coil 10 may be resorted to. When the liquid gases are thus used to cool the coil 10, the liquid gases having expanded in the box 46 will be returned to the pipe line 24 through the pipe line 49.

From the still chamber 13 the absorbent oil now freed from the condensable vapors and low boiling point liquid gases passes through the pipe 12 into the heat interchanger 11, where it parts with some of its heat, and from said heat interchanger into the cooling coils 10, where it is further cooled, thus completing the cycle through which the absorbent oil passes in the operation of the apparatus.

It is clear from the foregoing that the absorbent medium and the low boiling point liquid gases such, for example, as pentane, butane and propane are used over and over in carrying out this process. Of course, if the low boiling point liquid gases increase in quantity because of any liquid gases which may be contained in the hydrocarbon gases being treated, the surplus will discharge from the system through the safety valves 26, 32, said safety valves and the regulators 3, 8 and 38 and back pressure valve 6 being set to maintain desirable pressures in the system.

If the gases being treated for extraction of condensable vapors are discharged into the absorber through the pipe line 36, said gases together with the low boiling point liquid gases fed through the pipe line 36 will bubble up from the nozzle 39 through the body 53 of absorbent oil accumulated in the lower portion of the absorber 1. In such operation the low boiling point liquid gases mix with the gases being treated and reinforce said gases before coming into contact with the absorbent oil by adding to the volume of liquid gases which may be originally contained in the gases being treated; whereas, when the liquid gases are admitted to the nozzle 34, as above described, the low boiling point liquid gases only come into contact with the gases being treated and the absorbent oil at the point of expansion of the gases.

By admitting the low boiling point liquid gases to the pipe 2 through the pipe 43 said liquid gases will mix with the gases being treated thereby refrigerating the mixture and reinforcing the gases being treated or increasing the liquid gas content of the gases from which the gasoline and naphtha are to be recovered.

By admitting the low boiling point liquid gases through the pipe 41 to the pipe 7 the absorbent oil is recharged with the liquid gases and said liquid gases are absorbed by the absorbent oil before said oil discharges into the absorber 1.

From the foregoing it will be seen that the process involves the expansion of a suitable low boiling point liquid gas or gases in the presence of a carrier or absorbent medium and the gases from which the condensable vapors are to be removed, and involves the separation of the absorbed condensable vapors and absorbed low boiling point liquid gases from the absorbent medium by the application of heat, and involves the condensing of the hot condensable vapors and separation of the low boiling point liquid gases from the condensed vapors, and involves the compression or refrigeration of the liquid gases thus separated, and involves the condensing of the compressed liquid gases so as to liquefy said gases, and involves the expansion of the liquefied low boiling point liquid gases in a suitable expansion chamber in the presence of an absorbent medium and gases containing condensable vapor, and involves cooling the absorbent medium from which the vapors and liquid gases have been separated, and also involves the subjecting of the absorbent medium to the cooling action of some of the liquefied liquid gases, and further involves the presenting of the cooled absorbent medium to gases containing condensable vapors and to expanding low boiling point liquid gases.

Absorbent oils will absorb quantities of gases and vapors so as to become partly saturated with said gases and vapors. Therefore, when gases which merely occupy space without increasing the absorbent value of the absorbent oil are present in said oil, it is clear that the absorbent value of the oil is less than when such undesirable lighter gases are not present. As an example of such undesirable gases there may be mentioned methane and ethane. These gases when absorbed satisfy a definite degree of the absorbent value of the oil so as to render the oil less absorbent for recoverable vapors such as gasoline and naphtha. My process renders the oil more desirable as a solvent since it speeds up the absorption. This will be readily understood when it is considered that an absorbent oil, according to one operation of the process, is first partially saturated with a liquid gas, such, for example, as butane, pentane or propane or any desired combination of such liquid gases, before the oil enters the presence of the gases being treated for extraction of the condensable vapors. These liquefied liquid gases (such as butane, pentane and propane) prevent the oil from absorbing undesirable quantities of lighter gases of less value, and thus render the oil more receptive of the desirable recoverable condensable vapors such as the gasolines, naphthas and the like.

Another disadvantage which is obviated by my process will be comprehended if it be considered that when the lighter gases, such as methane and ethane above mentioned, are absorbed by the oil, owing to the high vapor tension and low boiling point of said lighter gases considerable trouble arises in the subsequent distilling of the oil because of the higher pressures and the tendency of said lighter gases to carry off with them the recoverable vapors when said lighter gases pass to the condenser. This of course decreases the yield of recoverable vapors and I have discovered that, in order to maximize the yield, such lighter gases as methane and ethane must be prevented to a maximum degree at the outset from being absorbed by the oil and this is effected in my process by the preabsorption of certain low boiling point liquid gases by the absorption oil.

Relatively high boiling point hydrocarbons such, for example, as 38° Bé. may be used to good advantage as the absorbent medium, and in such event the heat of distillation may run as high as 275° F. Also medium boiling point hydrocarbons such as the kerosenes and naphthas may be used as the absorbent medium and in such event the heat of distillation employed will be 190° F. more or less. When the medium boiling point hydrocarbons are used over and over, because of the relatively low heat of distillation to which they may be subjected, the medium boiling point hydrocarbons become gradually enriched by such condensable vapors as gasoline and the lighter naphthas so that, after the absorbent medium has been through an indeterminate number of cycles, the absorbent medium may be drawn off and used as engine fuel the same as the gasoline drawn from the condenser 21.

It is understood that, though it is preferable to employ the low boiling point liquid gas or gases to aid in the refrigeration of the absorbent medium and in the otherwise maximizing of the absorptive power of the absorbent medium, the expansion and consequent refrigerating action of the gases being treated for recovery of the vapors in the presence of the absorbent medium can alone be relied upon in the absorption operation to produce the refrigeration which enhances the absorption power of the absorbent medium.

I claim:

1. The process of recovering condensable vapors from gases, which consists in expanding the gases containing the vapors in the presence of an absorbent medium having therein a low boiling point liquid gas, separating the low boiling point liquid gas and condensable vapors from the absorbent medium, separating the low boiling point liquid gas from the condensable vapors, liquefying the low boiling point liquid gas thus separated, and expanding the low boiling point liquid gas thus liquefied in the presence of other gases containing condensable vapors and in the presence of the absorbent medium after said medium is freed from the previously absorbed vapors and liquid gas.

2. The process of recovering condensable vapors from gases, which consists in reinforcing the gases containing the vapors with a low boiling point liquid gas, expanding the gases thus reinforced in the presence of an absorbent medium, separating the low boiling point liquid gas and condensable vapors from the absorbent medium, and separating the low boiling point liquid gas from the condensable vapors.

3. The process of recovering condensable vapors from gases, which consists in reinforcing the gases containing the vapors with a low boiling point liquid gas, expanding the gases thus reinforced in the presence of an absorbent medium, separating the low boiling point liquid gas and condensable vapors from the absorbent medium, separating the low boiling point liquid gas from the condensable vapors, liquefying the low boiling point liquid gas thus separated, and expanding the low boiling point liquid gas thus liquefied in the presence of other gases containing condensable vapors and in the presence of the absorbent medium after said medium is freed from the previously absorbed vapors and liquid gas.

4. The process of recovering condensable vapors from gases, which consists in reinforcing the gases containing the vapors with a low boiling point liquid gas, expanding the gases thus reinforced in the presence of an absorbent medium, separating the low boiling point liquid gas and condensable vapors from the absorbent medium, separating the low boiling point liquid gas from the condensable vapors, liquefying the low boiling point liquid gas thus separated, cooling the absorbent medium from which the vapors and liquid gas have been separated, and presenting the cooled absorbent medium to more gases containing condensable vapors and to the liquefied low boiling point liquid gas while said liquid gas is expanding.

5. The process of recovering condensable vapors from gases, which consists in expanding a low boiling point liquid gas in the presence of an absorbent medium and gases containing condensable vapors, separating the low boiling point liquid gas and condensable vapors from the absorbent medium, and separating the low boiling point liquid gas from the condensable vapors.

6. The process of recovering condensable vapors from gases, which consists in expanding a low boiling point liquid gas in the presence of an absorbent medium and gases containing condensable vapors, separating the low boiling point liquid gas and condensable vapors from the absorbent medium, separating the low boiling point liquid gas from the condensable vapors, liquefying the low boiling point liquid gas thus separated, and expanding the low boiling point liquid gas thus liquefied in the presence of other gases containing condensable vapors and in the presence of the absorbent medium after said medium is freed from the previously absorbed vapors and liquid gas.

7. The process of recovering condensable vapors from gases, which consists in expanding a low boiling point liquid gas in the presence of an absorbent medium and gases containing condensable vapors, separating the low boiling point liquid gas and condensable vapors from the absorbent medium, separating the low boiling point liquid gas from the condensable vapors, liquefying the low boiling point liquid gas thus separated, cooling the absorbent medium from which the vapors and liquid gas have been separated, and presenting the cooled absorbent medium to more gases containing condensable vapors and to the liquefied low boiling point liquid gas while said liquid gas is expanding.

8. The process of recovering condensable vapors from gases, which consists in expanding a low boiling point liquid gas in the presence of an absorbent medium and gases containing condensable vapors, separating the low boiling point liquid gas and condensable vapors from the absorbent medium, separating the low boiling point liquid gas from the condensable vapors, liquefying the low boiling point liquid gas thus separated, subjecting the absorbent medium from which the vapors and liquid gas have been separated to the cooling action caused by expansion of some of the liquefied low boiling point liquid gas, expanding some of the liquefied low boiling point liquid gas in the presence of other gases containing condensable vapors and in the presence of the cooled absorbent medium, separating the last absorbed low boiling point liquid gas and condensable vapors from the absorbent medium, and separating the last low boiling point liquid gas from the condensable vapors.

9. The process of recovering condensable vapors from gases, which consists in expanding a low boiling point liquid gas in the presence of an absorbent medium and gases containing condensable vapors, separating the low boiling point liquid gas and condensable vapors from the absorbent medium, separating the low boiling point liquid gas from the condensable vapors, liquefying the low boiling point liquid gas thus separated, subjecting the absorbent medium from which the vapors and liquid gas have been separated to the cooling action caused by expansion of some of the liquefied low boiling point liquid gas, expanding some of the liquefied low boiling point liquid gas in the presence of other gases containing condensable vapors and in the presence of the previously absorbed vapors and liquid gas, separating the last absorbed low boiling point liquid gas and condensable vapors from the absorbent medium, and separating the last low boiling point liquid gas from the condensable vapors.

10. The process of recovering condensable vapors from gases, which consists in expanding gases containing gasoline vapor in the presence of kerosene, subjecting the kerosene with the absorbed gasoline vapors to distillation to separate some of the gasoline vapors from the kerosene, cooling the kerosene after the vapors are driven off, expanding more gases containing gasoline vapor in the presence of the cooled kerosene, and repeating over and over the foregoing cycle of steps until the kerosene becomes highly charged with gasoline.

11. The process of recovering condensable vapors from gases, which consists in injecting a low boiling point liquid gas into an absorbent medium, then presenting the gases containing condensable vapors to the absorbent medium carrying the liquid gas, then separating the low boiling point liquid gas and the vapors from the absorbent medium, and then separating the low boiling point liquid gas from the vapors.

12. The process of recovering condensable vapors from gases, which consists in injecting a low boiling point liquid gas into the gases containing condensable vapors, then presenting the mixture thus produced to an absorbent medium to cause absorption of the liquid gases and the vapors, then separating the low boiling point liquid gas and vapors from the absorbent medium, and then separating the low boiling point gas from the vapors.

Signed at Los Angeles, California, this 1st day of July 1919.

HARRY H. ARMSTRONG.

Witnesses:
GEORGE H. HILES,
L. BELLE WEAVER.